United States Patent [19]

Himy et al.

[11] 4,192,908

[45] Mar. 11, 1980

[54] MASS-TRANSPORT SEPARATOR FOR ALKALINE NICKEL-ZINC CELLS AND CELL

[75] Inventors: Albert Himy, University Park, Md.; Otto C. Wagner, Long Branch, N.J.

[73] Assignee: The United States of America as represented by the Secretary of the Navy, Washington, D.C.

[21] Appl. No.: 48,878

[22] Filed: Jun. 15, 1979

[51] Int. Cl.² .................................. H01M 2/12
[52] U.S. Cl. .............................. 429/53; 429/223; 429/229; 429/248; 429/254
[58] Field of Search ............... 429/254, 248, 53, 223, 429/229–231

[56] References Cited

U.S. PATENT DOCUMENTS

| | | | |
|---|---|---|---|
| 3,539,396 | 11/1970 | Wagner | 429/247 X |
| 3,775,661 | 11/1973 | Frezzolini et al. | 429/58 X |
| 3,970,472 | 7/1976 | Steffensen | 429/223 X |
| 4,084,047 | 4/1978 | Himy et al. | 429/229 X |
| 4,124,743 | 11/1978 | Chireau et al. | 429/248 X |

*Primary Examiner*—Charles F. Lefevour
*Attorney, Agent, or Firm*—R. S. Sciascia; A. L. Branning; R. D. Johnson

[57] ABSTRACT

A mass-transport separator for use in alkaline nickel-zinc cells which comprises a barrier layer of a microporous membrane which contains a laminate of a material having a hydrogen overpotential in alkaline solution which is lower than that of zinc, the barrier layer being sandwiched between two protective layers of microporous polyolifin material.

27 Claims, 5 Drawing Figures

MASS-TRANSPORT SEPARATOR FOR ALKALINE NICKEL-ZINC CELLS AND CELL

BACKGROUND OF THE INVENTION

This invention relates to alkaline cells and more particularly to alkaline cells having zinc electrodes.

Nickel-zinc cells offer the advantages of high EMF, high energy per unit of weight and volume, and low cost. In recent years the nickel-zinc battery has been receiving increased attention by the Energy Department as a candidate for use in electric vehicles. The Defense Department is also interested in nickel-zinc cells for use in electric propulsion, aircraft, combat vehicles, and electronics communication batteries. Obviously, long life nickel-zinc batteries are necessary for these applications.

The most commonly employed separators have a cellulosic structure in the form of cellophane (regenerated cellulose by the Xanthate process) or fibrous sausage casing (prepared from cotton linters). These separators are catonic-diffusion controlled semipermeable membranes; i.e., during the charge and discharge processes they favor the diffusion of hydrated potassium ions.

Tests show that shorting by zinc penetration through diffusion-type separators usually results in partial shorts; zincate ions have difficulty in diffusing through the highly tortuous interstices of these separators. Zinc dendrites that reach the nickel sinter of the nickel cathode electrode are apparently dissolved by the vigorous local action between zinc and the nickel sinter at a rate equal to or greater than the regrowth of new zinc dendrites into the nickel cathode compartment. The net result is a minute reduction in potential between the zinc anode and nickel cathode.

A serious disadvantage of solely using several layers in the diffusion-type separator is that they usually cause the formation of large concentration gradients, particularly when employed as several layers. Large concentration gradients produce electro-osmotic pumping effects which promote washing and shape change of the zinc anodes with the resulting loss of capacity by the cell.

On the other hand, mass transport-type membranes minimize the formation of large concentration gradients. Unfortunately, in the case of these mass-transport separators, zincate ion mobility is not impeded, and zinc dendrites are generated in the open micropores. These zinc dendrites then reach the nickel cathodes as a front within a relatively short time. The resulting short is massive between the zinc anode and the nickel cathode.

SUMMARY OF THE INVENTION

Accordingly, it is an object of this invention to increase to charge-discharge cycle life of alkaline nickel-zinc cells.

A further object of this invention is to minimize the formation of concentration gradients in alkaline nickel-zinc cells.

Another object of this invention is to minimize the shape change of alkaline zinc electrodes.

A still further object of this invention is to prevent or retard zinc dendrites from producing shorts between the zinc anodes and the nickel cathodes.

These and other objectives of the invention are accomplished by providing a battery separator which comprises:

(1) a barrier layer comprising a microporous polyolifin membrane which is coated on one face with a layer of from 50 Å to 1000 Å of a material which has a hydrogen overpotential in alkaline solution which is lower than that of zinc;

(2) two protective layers of microporous polyolifin;

The barrier layer being sandwiched between the two protective layers of microporous polyolifin.

The separators of the present invention are useful in cells having alkaline zinc anodes, particularly in alkaline nickel-zinc cells.

BRIEF DESCRIPTION OF THE DRAWINGS

A more complete understanding of the invention and many of the attendant advantages there to will be readily appreciated as the same becomes better understood by reference to the following detailed description when considered in connection with the accompanying drawings wherein.

DETAILED DESCRIPTION OF THE PREFERRED EMBODIMENT

Figure 1:
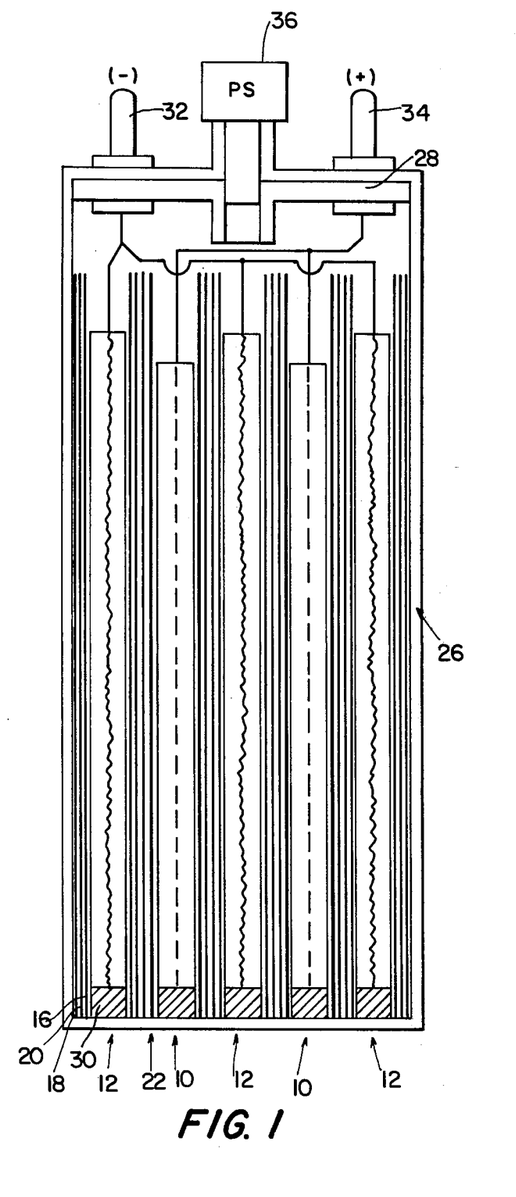
FIG. 1 is a cross section of a nickel-zinc cell taken normal to the anode and cathode plates.

Referring now to the drawings, wherein like reference numerals designate corresponding parts in the several views, there is shown in FIG. 1 a cross-sectional side view of a cell with nickel-nickel hydroxide cathode plates 10 and zinc-zinc oxide anode plates 12. The nickel cathode 10 is covered with a polyamide felt 22. A separator system 14 is placed between the nickel cathodes 10 and the zinc anodes 12. The unit cell case 26 and cell cover 28 bonded together to provide an hermetically sealed enclosure. Epoxied bases 30 provides one method of isolating the cathode and anode compartments. Another method is to fold the separator system whereby the cathodes are contained within the envelope and the anodes are outside the wrap, which is usually in an accordion configuration. A negative terminal 32 is mounted in the unit cell cover 28 and is electrically connected to each of the zinc anodes 12. Similarly, a positive terminal 34 is mounted into the unit cell cover 28 and is electrically connected to each of the nickel cathodes 12.

Figure 2:
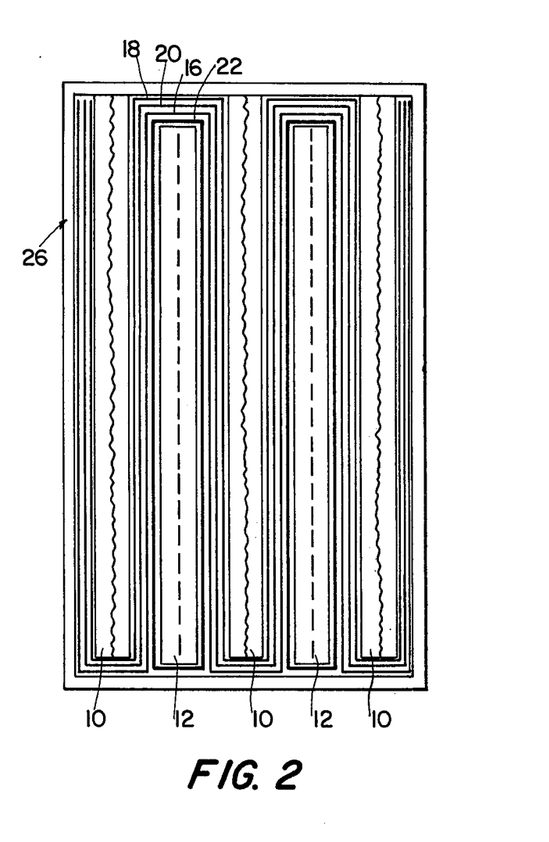
FIG. 2 is a cross section taken from the top of the cell.

FIG. 2 shows a cross section of the cell as viewed from the top of the cell. It shows an accordion wrap of the separator system 14 around the cathodes 10 and the anodes 12.

As is shown in FIG. 2, the separator 14 comprises a barrier layer 20 which is sandwiched between two protective outer layers 16 and 18.

These layers 16, 18, and 20 are made from membranes composed of microporous polyolifin materials such as microporous polyethylene, polypropylene, or polybutadiene. The polyolifin materials must be tough, flexible, and resistant to attack by strong alkali. The microporous polyolifin membranes used to form the protective outer layers (16 and 18) of the separator are uncoated. As discussed later, the one or more membranes used to form the barrier layer 20 are coated on one or more faces with a low hydrogen overpotential material. Preferably the microporous polyolifins membranes have an average pore size of from 100 Å to 500 Å. Preferably the outer layers 16 and 18 will have a smaller average pore size than the middle, coated layer 20. The preferred thickness of the microporous polyolifin membranes used in each of the layers is from 0.5 to 2.0 mils, and more preferably 1.0 mil.

The barrier layer 20 is formed by coating one or more microporous polyolifin membranes on one or more sides (faces) with a material having a hydrogen overpotential which is lower in alkaline media than that of zinc. Typical low hydrogen overpotential materials which may be used are metals and alloys such as nickel, stainless steel, iron, cobalt, platinum, palladium, indium, chromium, maganese, carbon, and titanium. Nickel and stainless steel are preferred, with nickel being more preferred. A simple test for suitable materials involves placing strips or chips of the material into a concentrated aqueous solution of KOH and then adding zinc powder with stirring. Fizzling of the solution with disappearance of the zinc dust demonstrates that the material tested has a sufficiently low hydrogen overpotential in alkaline solution. A second essential property of the coating material is that it must be insoluble in strong aqueous alkali solutions.

The material can be applied by conventional means such as sputtering or electroless deposition. A layer of low hydrogen overpotential material of from 50 Å to 1000 Å is preferred, with from 100 Å to 500 Å being more preferred. Improved results were obtained by coating each of two microporous polyolifin membranes on one side with the low hydrogen overpotential materials and then placing the two membranes together with the coated sides face to face. This method will produce a battery with a longer life than a battery containing a membrane with a single coating having the same quantity of low hydrogen overpotential material. This face to face technique also reduces the amount of flaking of the low hydrogen overpotential material from the polyolifin substrate. Another, variation is to coat both faces of a single microporous polyolifin membrane. Whichever form of low overpotential coated microporous polyolifin layer is selected, it is then sandwiched between the two uncoated microporous layers 16 and 18 to form the separator 14. The layers of the separator 14 are then bound together by conventional means. It has been found that because of hydrogen gas evolution, these separators should only be used in fully vented alkaline nickel-zinc cells.

A more preferred separator is prepared by coating one face of a microporous polyolifin membrane with a low hydrogen overpotential material as above and then covering the coated face of the membrane with a semipermeable hydroxyl containing polymeric membrane such as cellophane or polyvinyl alcohol which are cationic type layers. The barrier layer 20 thus formed is then sandwiched between two uncoated microporous polyolifin protective layers 16 and 18 to form the separator. The hydroxyl containing polymeric membrane is placed in contact with the protective layer 18 which is in contact with the anodes 12 in the final cell. The hydroxyl containing polymeric membranes used must be active materials which readily form salts of alkali metal ions, retain water by hydrogen bonding, and prevent the precipitation of zinc oxide from the retained zincate ions. Typical of these membranes are the cellulosic and the polyvinyl alcohol membranes. These hydroxyl containing polymeric membranes must also be resistant to degradation by strong alkali. Preferably the average pore size should be from 10 Å to 50 Å, and more preferably from 15 Å to 25 Å. The thickness of the semipermeable hydroxyl containing polymeric membrane is from 0.05 mils to 8.0 mils, and more preferably from 0.1 mils to 3.0 mils. The remaining components of the cell are selected to maximize cell life. With this nickel laminate being protected by the cationic type layers hydrogen evolution is minimal and the nickel-zinc cells can be safely constructed as sealed cells, preferably having pressure cutoff switches to reliably control the charge input, said pressure setting being at 5 psig to 8 psig, with precision venting being at $10.0\pm0.5$ psig.

Sintered nickel plate cathodes work well in the cell; however, the preferred plates are electrochemically rather than chemically impregnated. Buckling of the nickel hydroxide cathodes on cycling is minimal with the former, but can become serious with plates made by the multistep chemical process. The multiple impregnations in an acidic nitrate bath weaken the nickel sinter, while the heavy loading decreases the plate porosity. With repeated overcharges, oxygen gases generated within the pores of these plates exert immense stresses throughout the electrode structure, a condition which results in expansion and buckling of the plates. This can be avoided by replacing the chemically impregnated plates with more stable electrochemically prepared nickel-nickel hydroxide electrodes. The electrochemical process consists of cathodizing the sintered nickel plaques in a nonaqueous nickel nitrate bath and thereby fully impregnating the plaques in one cycle. The nickel cathodes 10 are further protected by wrapping them bibulous polyamide felt 22.

Conventional zinc-zinc oxide anodes may be used in the cell. Preferred are the zinc-zinc oxide paste electrodes disclosed and claimed in U.S. Pat. No. 4,084,047, entitled "Stable Alkaline Zinc Electrode," and issued to Albert Himy and Otto C. Wagner on Apr. 11, 1978, and herein incorporated by reference. In those anodes, small amounts of binary additive mixtures of $Tl_2O_3$, PbO, CdO, $SnO_2$, $In(OH)_3$, and $Ga_2O_3$ are used to reduce the corrosion, or shape change of the zinc anode. The rate of shape change is further reduced by adding a few percent by weight of teflon powder to the anode paste.

The separator is placed between the cathodes 10 and anodes 12, the cathodes being clad in bibulous felt material 22, such as nylon, so that first uncoated microporous polyolifin layer 16 only contacts the felt layer 22 of the cathodes 10 and the other uncoated microporous polyolifin only contacts the anodes 12. An accordion wrap such as shown in FIG. 2 works well for this purpose.

The preferred electrolyte is a 28 to 38 percent aqueous potassium hydroxide solution which is saturated with zincate ions. Preferably, the electrolyte contains from 30 to 35 percent by weight potassium hydroxide, with from 30 to 31 percent being the most preferred. The addition of 1 percent by weight of lithium hydroxide is also desirable.

Low concentrations of electrolyte are desired so as to provide a large enough reserve of water to compensate for water lost whenever zinc dendrites make an encounter with the nickel coated polyolifin separator. The reason for this can be seen by considering the mechanism by which the coating of low hydrogen overpotential material of the separator inhibits zinc dendrite penetration (in this case nickel). The half reactions occur as follows:

micro dendrites anodes Zn+4 OH Zn(OH)$_4$= +2e
cathodic sites 2H$_2$O+2e→H$_2$↑ +2OH⁻—
overall Zn+2H$_2$O+2OH⁻→H$_2$+Zn(OH)$_4$=

The zinc dendrites act as micro anodes and the nickel coating provides the cathodic sites. At the anodic sites zinc metal is converted into zincate ions, thereby dissolving the zinc dendrites. At the cathodic sites water is converted into hydrogen gas and hydroxide ions.

The general nature of the invention having been set forth, the following examples are presented as specific illustrations thereof. It will be understood that the invention is not limited to these examples but is susceptible to various modifications that will be recognized by one of ordinary skill in the art.

to short as seen by a 200–500 millivolt drop on the zinc to zinc potential chart was noted. On the zinc to Ni-(OH)$_2$ potential chart the short is seen as a very small dip in potential in the case of a partial short, or as a 1.0 volt to 1.5 volt drop in the case of a massive, or "dead" short.

Table 1 lists 14 different separators and separator combinations that were evaluated. Listed in the table are: (a) wet thickness of the separator(s) in mils (column 3) (b) electrical resistivity of the separator in milliohms-in$^2$ (column 4), (c) time for the cell to short in ampere-hours, either partial or full shorts (column 5) and (d) ampere-hours to short per mil of wet separator.

TABLE I

| TEST NO. | SEPARATOR(S) | NO. OF TESTS | WET THICKNESS MILS | RESISTIVITY /in$^2$ (42% KOH) | AH TO SHORT | AH PER MIL |
|---|---|---|---|---|---|---|
| (1) | 3 layers of Celgard 3400 | (4) | 3.0 | .010 | 0.024 | 0.008 |
| (2) | 1 Celg 3400/Ni(50Å)-Celg 2500/1 Celg 3400 | (2) | 3.0 | .011 | 0.072 | 0.024 |
| (3) | 1 Celg 3400/Ni(100Å)-Celg 2500/1 Celg 3400 | (2) | 3.0 | .012 | 0.100 | 0.033 |
| (4) | 1 Celg 3400/Ni(200Å)-Celg 2500/1 Celg 3400 | (2) | 3.0 | .011 | 0.320 | 0.107 |
| (5) | 1 Celg 3400/Ni(250Å)-Celg 2500/1 Celg 3400 | (3) | 3.0 | .011 | 0.340 | 0.113 |
| (6) | 1 Celg 3400/Ni(500Å)-Celg 2500/1 Celg 3400 | (2) | 3.0 | .012 | 0.655 | 0.218 |
| (7) | 1 Celg 3400/Ni (100Å)-Celg 2500-Ni (100Å)/1 Celg 3400 | (2) | 3.0 | .012 | 0.667 | 0.222 |
| (8) | 1 Celg 3400/Ni(250Å)-Celg 2500-Ni(250Å)/1 Celg 3400 | (2) | 3.0 | .017 | 0.855 | 0.285 |
| (9) | 1 Celg 3400/Ni(1000Å)-Celg 2500-Ni(1000Å)/1Celg 3400 | (2) | 3.0 | .020 | 1.835 | 0.612 |
| (10) | 1 Celg 3400/Celg 2500-Ni(250Å)/Ni(200Å)-Celg 2500/1 Celg 3400 | (2) | 4.0 | .012 | 1.025 | .256 |
| (11) | 1 Celg 3400/Celg 2500-Ni(250Å)/Celg 2500-Ni(200Å)/1 Celg 3400 | (2) | 4.0 | .012 | 0.922 | .231 |
| (12) | 1 Celg 3400/Celg 4500-NiFelt (200Å)/1 Celg 3400 | (2) | 6.0 | .012 | 1.820 | .307 |
| (13) | 1 Celg 3400/NiFelt 200Å)-Celg 4500 | (2) | 6.0 | .012 | 1.760 | .287 |
| (14) | 1 Celg 3400/Ni(200Å)-Celg 4500-Felt/1 Celg 3400 | (2) | 6.0 | .015 | 1.420 | .237 |

EXAMPLE 1

Zinc Penetration Test

The test cell included a sheet zinc cathode, a corroding sheet zinc anode, and a Ni(OH)$_2$ reference electrode about which the test separator was wrapped. The electrolyte was 42% aqueous KOH which was saturated with zincate ions, a large excess of electrolyte being used in each test cell. Prior to testing each cell was allowed to soak for two days. The test cell was overcharged (sheet zinc cathode versus the corroding zinc anode) at a current density of 100 MA/in$^2$, while the potential between the zinc cathode and corroding zinc anode was recorded on the 500 millivolt scale and the potential between the zinc cathode and nickel hydroxide electrode was recorded on a 5 volt scale. The time The nickel on the Celgard layers was deposited by a sputtering technique. The substrate for tests 1 through 11 was Celgard 2500 (from Celanese Plastic Company), which is 1.0 mil thick and has an average pore size of 400 Å. For tests 12 through 16 the substrate was Celgard 4500 which consists of a 3.0 mil layer of nonwoven polypropylene felt embossed on a layer of Celgard 2500.

Test #1, the blank, contained 3 layers of uncoated Celgard 3400 (from Celanese). In tests 2 through 14, the nickel coated layers were sandwiched between two layers of Celgard 3400, each layer being 1.0 mil thick with an average pore size of 200 Å. The Celgard 3400 layers were used to prevent local action between the zinc electrode and the nickel coating on the Celgard 2500 substrate as well as to isolate the metallic conductor from both the anodes and cathodes.

Figure 3:
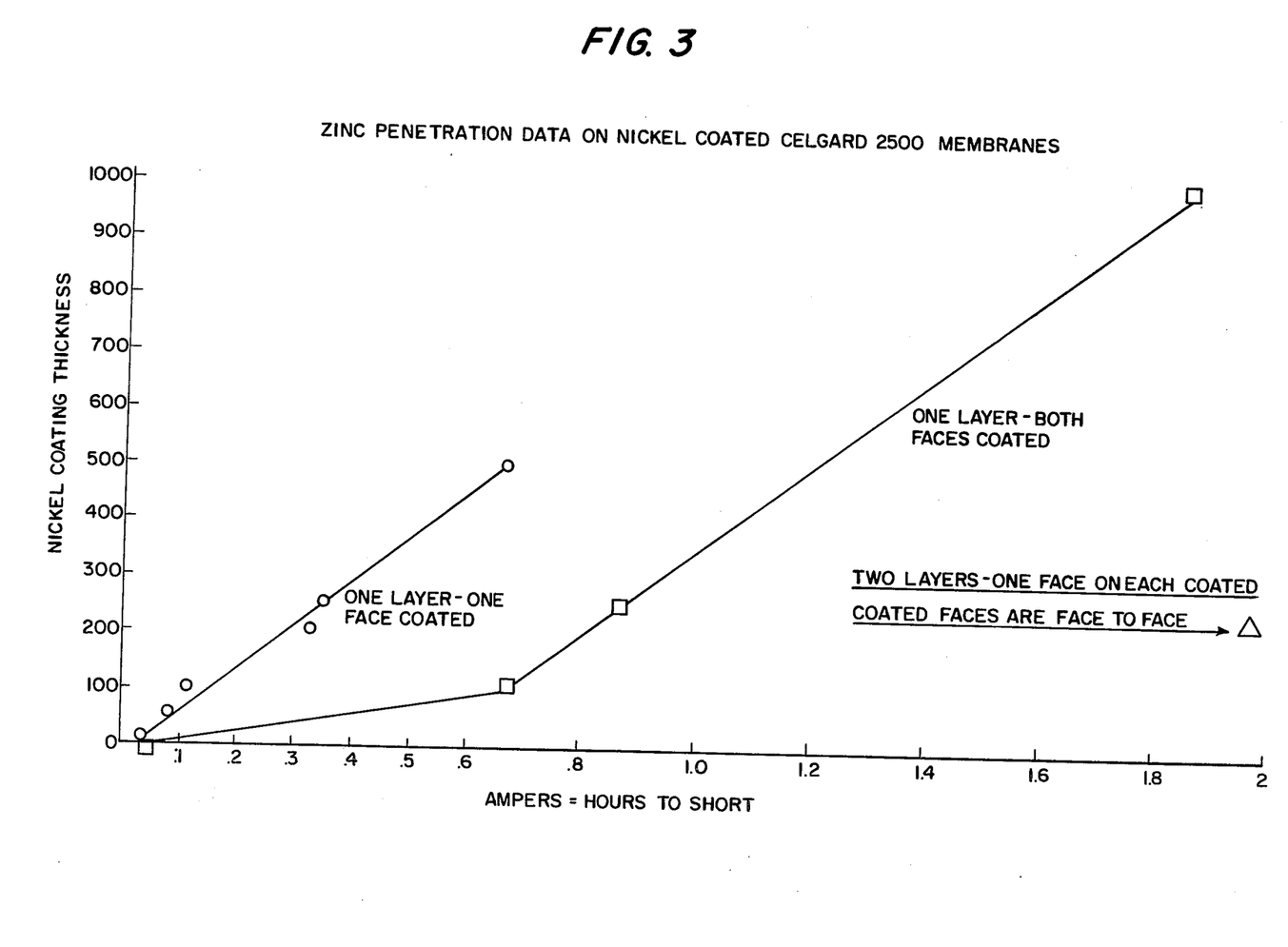
FIG. 3 is a graph showing the time it took before a short occurred for different types of separators in the zinc penetration test and this graph is discussed in Example 1.

Tests 2 through 6 were used to evaluate single layered nickel coatings on Celgard 2500. From the left-hand curve in FIG. 3, it is seen that the penetration time (s Ah) increases linearly with increasing thickness of the single layered nickel coating; i.e., from thickness of 50 Å to 500 Å. Failure in all cases was due to some shedding and flaking of the nickel from its polypropylene substrate, mainly in regions of greatest stress and strain, such as at the folds of the separator.

In tests 7 to 9 the Celgard 2500 substrate was nickel coated on both faces to thicknesses of 100 Å, 250 Å and 1000 Å. The thickness versus capacity to short curve of the double layered samples is seen to the right of the first curve in FIG. 3. The double layered curve is also linear, between 100 Å and 1000 Å, but the ampere-hours to short were much greater than double the values of the single layered tests. For example, at 100 Å (#3) the capacity to short was 0.100 Ah for the single layered test and 0.667 Ah for the double layered test (#7); at 250 Å (#5) it was 0.340 Ah (single layer) versus 0.855 Ah (#8) (double layer). As with the single layered tests, failure of the double layered test was due to nickel shredding, but to a much lower extent (again in the regions of greatest stress).

In test number 10 two single layered samples of 250 Å nickel coating were placed face to face to effectively serve as a single 400 Å layer, and in test number 11 two single layered samples of 250 Å coating were placed back-to-back—simulating a layer of Celgard 2500 with each face having a nickel coating 250 Å thick. These variations of the single layered samples were run since it is less costly to coat nickel on one face than on both of the Celgard 2500 substrate. In the case of the face to face test (No. 10) the ampere hours to short was 1.025 Ah, shown as an open triangle in FIG. 3. This compares with about 0.53 Ah for a single 400 Å nickel coated sample and about 0.80 Ah for the sample coated with 200 Å of nickel on each face. Nickel shedding again limited the life of the test cell, but the improved resistance to shorting over the single and double coated variations was significant. For the back to back test (No. 11) it took about 0.92 Ah to short, which compares to 0.80 Ah for the comparable double layered sample.

One approach taken to prevent nickel shedding was to nickel coat Celgard 4500 (3 mils of nonwoven polypropylene felt embossed on 1 mil of Celgard 2500). It was believed that nickel flaking would be prevented by: (a) a buttress effect on the felt fibers on to the Celgard film wall, and (b) providing a gas channel so that hydrogen generated by the dissolution of dendrite zinc would have a free path. In test 12, the felt layer was nickel coated and was facing the nickel reference electrode, while in test 13, it faced the zinc cathode. For the sake of comparison, in test no. 14, the sample was prepared with the 200 Å nickel coating on the film side, the felt layer being nickel free. The data in the table show that the capacities to short for the nickelized felt samples were 1.82 Ah for test 12, 1.76 Ah for test 13, and 1.42 for test 14. These valued compare with 0.34 Ah of the single layered 200 Å sample and 0.80 Ah for the double layered sample, a significant improvement but at the price of the added 3 mil in thickness of the felt layer and therefore was not further evaluated.

EXAMPLE 2

Cell Life Tests (Single Electrode Designs)

For the single electrode test cell. Two layers of Celgard 2500 (a 1 mil thick layer of polypropylene having an average pore size of 400 Å) were each coated on one face with a smooth, pin-hole-free layer of nickel, 500 Å thick. These two layers were placed together with the nickel coated surfaces being face to face and said 2 layers then being sandwiched between two layers of uncoated Celgard 3400 (1 mil thick polypropylene having an average pore size of 200 Å). After the layers were bound together, the separator was wrapped around the anodes and cathodes accordion style (see FIG. 2). One of the layers of Celgard 3400 was into contact with the polyamide felt clad nickel hydroxide cathode plate (single electrode), and the other layer of Celgard 3400 was in contact with the two zinc-zinc oxide anode plates.

A blank cell as a control was prepared using a separator system of 3 uncoated layers of Celgard 3400.

The remaining design parameters of both the test cell and the blank cell are summarized in Table 2.

TABLE 2

| | Blank Cell | Test Cell |
|---|---|---|
| Electrolyte | 34% KOH + 1% LiOH | |
| Electrolyte Quantity | 5 cc (excess) | Same |
| Nickel Cathodes | | |
| (a) Type impregnation | chemical | Same |
| (b) Thickness | .032" ± .0005" | Same |
| (c) Dimensions | 1.94" w × 2.05"h | Same |
| (d) Weight of Ni(OH)$_2$ Per Plate (gms) | 4.43 | Same |
| (e) No. of Cathode Plates per Cell | 1 | Same |
| (f) Theoretical Capacity (Ah) | 0.90 | Same |
| (g) Coining | 1/32" on the edges | Same |
| (h) Tabs | .008" × 1" w Nickel Tabs | Same |
| Zinc Anodes | | |
| (a) Formulation | 1% PbO + 2% CdO + 2% Teflon + 95% ZnO | Same |
| (b) Powder Density (as Zn) | 1.9 gm/CC | Same |
| (c) Grid | 2 mil Ag Foil | Same |
| (d) Leads | 2 × 15 mil d. Ag wires | Same |
| (e) Wrap | One layer of 2 mil Aldex Paper | Same |
| (f) Number and Thickness of Full Anode Plates | 2 × 0.34" ± .001" | Same |
| (g) Plate Dimensions | 2.00" w × 2-3/16" h | Same |
| (h) Theoretical Capacity | 2 × 3.0 Ah | Same |

Several formation cycles were employed until the cell capacity leveled off at values usually in the range 0.75 Ah to 0.80 Ah. This took about 3 to 5 cycles. Formation cycling consisted of charging the cells at the 200 mA rate (d.c.) for 5 hours and discharging at the same rate to 1.0 volt per cell.

The test cycles for both the test and the blank cells were as follows:

(1) the cells were charge at 200 mA (d.c.) (26 mA/in$^2$) for 16 hours (12 hours overcharge);

(2) then discharge at 800 mA (104 mA/in$^2$) to 0.5 V; and (3) drained at 200 mA (26 mA/in$^2$) to 0.5 V.

Figure 4:
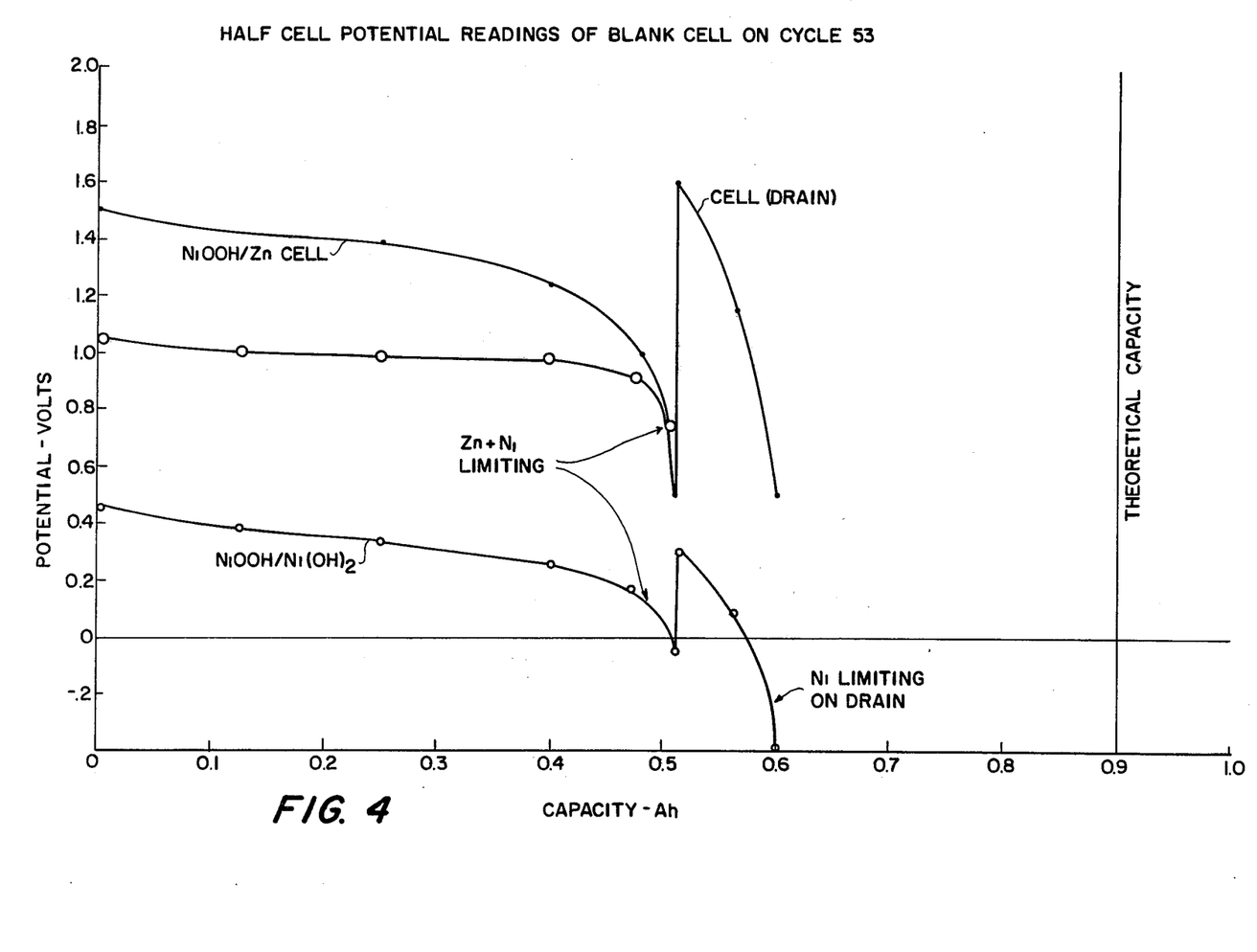
FIGS. 4 and 5 are graphs showing discharge data obtained in tests of nickel-zinc cells and are discussed in Example 2.
Figure 5:
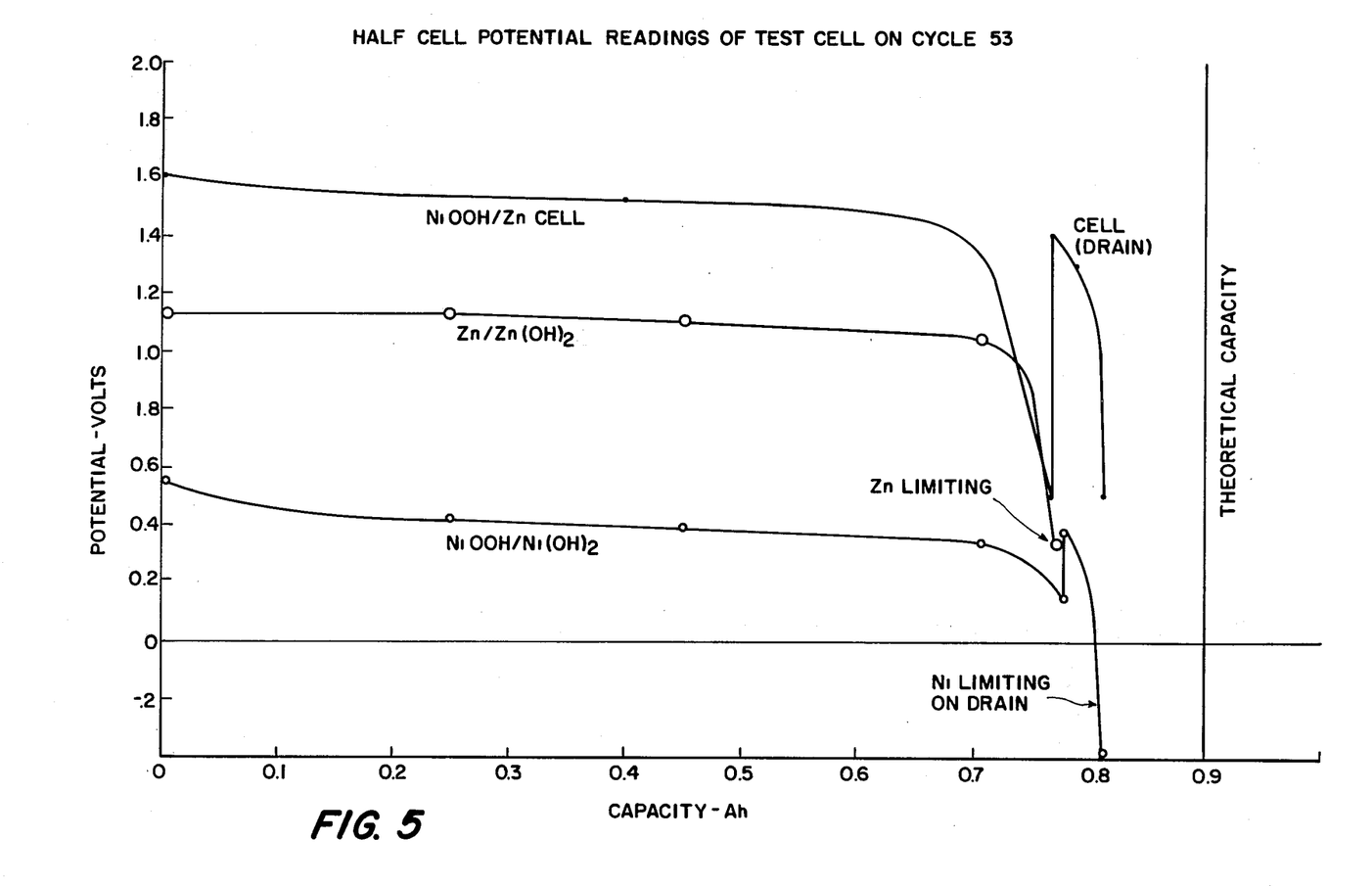

The test results for the 53rd cycle for the blank cell are plotted in FIG. 4 and for the same cycle of the test cell they are plotted in FIG. 5. It can be seen that the electrical capacity of the test cell with the nickel coated separator system had a capacity of 0.80 ampere hour (0.90 Ah being theoretical), as compared to 0.60 ampere-hour for the blank. In addition, this heavy overcharge induced intermittant shorts in the blank cell, while the test unit was totally free of shorts. These data further substantiate the advantage of employing a nickel coated separator system in the nickel-zinc battery; i.e., not only is shorting prevented, but the capacity retention on cycling is significantly improved.

EXAMPLE 3

Cell Life Tests (Full Cell Components)

Experimental 5 ampere-hour nickel-zinc cells were constructed using the same design features as shown in Table 2 except for the following:

1. Eight 0.032" nickel cathodes instead of one,
2. Nine zinc anodes instead of two,
3. 27.0 cc to 28.0 cc of electrolyte (no excess) instead of the 5 cc (excess) of example 2,
4. Both electrochemically and chemically impregnated nickel cathodes instead of only chemical, and
5. Theoretical capacity of 7.2 Ah for the cathodes instead of 0.9 Ah and 24.0 Ah as the theoretical capacity of the zinc anodes instead of 6.0 Ah.

The following provide a more detailed description of the cell components and formation procedure.

(a) Zinc Anode

The posted zinc oxide anodes did not contain a mercury additive. Instead they contained the improved formulation of 1% PbO, 2% CdO, 2% teflon, and 95% ZnO powders. A method of preparing these anodes is disclosed in U.S. Pat. No. 4,084,047. entitled "Stable Alkaline Zinc Electrode," issued to Albert Himy and Otto C. Wagner on Apr. 11, 1978, at Column 5, herein incorporated by reference.

(b) Electrolyte quantity

The cells were electrolyte starved; that is, they contained just enough electrolyte to fill the pores of the separator layers and electrodes. Filling was done via a filling funnel attached to the cell vent port under a partial vacuum. The quantity of electrolyte contained within the funnel was about 90% of the calculated void volume of the electrodes and separators. Additional electrolyte was added dropwise after an overnight soak until a slight excess amount had been added. This was seen through the translucent ABS cell case as several drops of electrolyte running along the cell wall when the cell was inverted. The excess quantity of electrolyte was then removed by syringe via a filling hole. The exact quantity of electrolyte, which was between 27.0 cc and 28.0 cc, was then determined from the weight gain of the cell.

(c) Pressure Cutoff

Both the test and blank cells had a General Research Labs GRL-PS-078-8 pressure cutoff switch attached to the port of the cell vent. The switch was set to a charge cutoff of 8.0±0.5 psi. The switch also contained a GRL-RV-500-1033 precision relief vent to operate at 10.0±0.5 psig. These switches are commercially available from General Research Laboratories, Hawthorne, N.J. A suitable pressure charge cutoff switch is also disclosed in U.S. Pat. No. 3,775,661, entitled "Rechargeable Battery Power Source With Gas Pressure Switch," issued to James Frezzolini and James J. Crawford on Nov. 27, 1973, hereby incorporated by reference. Each cell also had an attached pressure-vacuum gauge in order to monitor the gassing and gas recombination rates during the charge, charged stand, discharge and discharged stand phases of cycling.

(d) Cell Case

Single ABS units cells of the BB-509 nickel-zinc battery were used for both cells. The inner dimensions of each cell was 0.740" (at one half the height)±0.005" wide×2¼" long×3 3/16" high.

(e) Terminals

Standard Ni/Cd nickel terminals were used for the cathodes to which the nickel tabs of the sintered nickel cathodes were attached by a screw assembly. The anode terminals were silver plated hollowed nickel pieces, into which the silver leads of the anodes were secured by silver solder.

(f) Positive Interseparator

The sintered nickel cathodes were clad with a single layer of 5.0 mil polyamide felt, Pellon 2502K4.

(g) Sintered Nickel Cathode

All cathodes were of the sintered-type, and were chemically prepared by by Eagle Picher Industries, Colorado Springs, Colo.

Formation of the 5 Ah N.12r Cells

Seven formation cycles were employed until the cell capacity leveled off at values usually in the range of 6.3 Ah to 6.5 Ah. This took about 5 to 6 cycles. Formation cycling consisted of charging the cells at the 1 ampere rate (d.c.) to a pressure cut off of 8 psig and discharging at the same rate of 1.0 volt per cell.

To create an oxygen atmosphere within the cells, they were placed in a vacuum desiccator and subjected to a partial vacuum of about 26–28 inches of mercury for about one minute just prior to formation cycling. Under the partial vacuum, the 10 psig vents attached to the pressure switch plus vacuum/pressure gauge assembly, released a considerable amount of entrapped air. Upon slowly repressurizing the desiccator, the vacuum pressure gauge dropped to a partial vacuum of 5 to 10 inches of mercury. The cells were then given their first formation cycle. After the cells cutoff on their first charge at 8 psig, they were manually vented by means of lifting the piston head plunger of the GRL vents. With the internal cell pressure back to zero, charging was continued until a second 8 psig cutoff was attained, upon which the cell was vented a second time. This operation was repeated four times, after which the oxygen rich cells had attained the theoretical input capacity of the nickel cathodes (7.2 Ah). The purging operation was carried out only once in the life of the cell (cycle 1). Formation cycling was then continued until the attainment constant electrical capacities.

Seven cells were tested and the results are listed in Table 3. For each test cycle the cells were charged at a 1 ampere rate (dc) until an internal gas pressure of 8 psig was reached; the cells were then discharged at a 1 ampere rate until 1 volt cell potential was reached. The major design difference in the cells tested was in the separator used.

TABLE 3

| CAPACITY (AMPERE-HOURS) of 5Ah EXPERIMENTAL NICKEL-ZINC CELLS | | | | | | | |
|---|---|---|---|---|---|---|---|
| Cell No. | 1 | 2 | 3 | 4 | 5 | 6 | 7 |
| Cycle No. | | | | | | | |
| 5 | 6.3 | 6.3 | 6.5 | 6.3 | 6.3 | 6.3 | 6.5 |
| 25 | 6.3 | 6.3 | 6.3 | 6.3 | 6.3 | 6.3 | 6.5 |
| 50 | 6.1 | 6.1 | 6.0 | 6.1 | 6.1 | 6.3 | 6.5 |
| 75 | 5.9 | 6.0 | 5.9 | — | — | 6.2 | — |
| 100 | 5.8 | — | 5.8 | — | — | 6.1 | |
| 125 | 5.6 | — | — | — | — | 6.0 | |

TABLE 3-continued

CAPACITY (AMPERE-HOURS) of 5Ah
EXPERIMENTAL NICKEL-ZINC CELLS

| Cell No. | 1 | 2 | 3 | 4 | 5 | 6 | 7 |
|---|---|---|---|---|---|---|---|
| 150 | 5.0 | — | — | — | — | — | — |

In cells Nos. 1 and 5 the separators were made from 3 layers of 1 mil thick uncoated microporous polypropylene (Celgard). Cell No. 1 was shorted by zinc penetration on the 170th cycle; a 60% shape change in the zinc andoes was noted. Cell No. 5 shorted on the 51th cycle because of an accidental overcharge; a 30% shape change in the zinc anodes was noted. As was shown in Examples 1 and 2, an uncoated microporous separator system is vulnerable to zinc-penetration shorting. It also promotes shape change on the zinc anodes, in that a considerable amount of the zinc oxide is deposited within the separator layers and within the pores of the electrochemically inert microporous layers.

In cell No. 2, the separator consisted of three layers of 1 mil thick cellophane. This cell shorted out on the 82th cycle because of the oxidative degradation of the cellophane at the folds of the separator. In general, cellulosic separators are vulnerable to oxidative degradation in alkali, particularly at the edges where the separator layers wrap about the electrodes. In the case of cell No. 2, the edge degradation resulted in a premature short by the exposure of the edges of the plates. However, cell No. 2 showed very little signs of zinc oxide precipitation in the separator layers or zinc shape change, the shape change being only 5 to 10%.

In cell No. 3, the cell was formed by coating one face on each of two Celgard 2500 membranes with a layer of nickel 350 Å thick, placing the membranes together with the coated faces face to face, and then sandwiching the resulting barrier layer between two Celgard 3400 membranes. This cell was maintaining capacity at the same rate as cell No. 1 after 100 cycles, but it was generating a considerable amount of hydrogen after 75 cycles (which can be prevented by protecting the nickel layer with a cationictype layer as shown in cell No. 7).

In Cell No. 4, the separator was made from one layer of Celgard and two layers of cellophane. As with cell No. 5, Cell No. 4 shorted out on the 51th cycle due to an accidental overcharge. The shape change of the zinc anode of cell No. 4 was only 5% as compared to 30% for cell No. 5. This again demonstrates that cellulosic membranes (in this case cellophane) is much more effective in reducing zinc oxide precipitation and zinc shape change than the coated or uncoated microporous polyolifins separators.

In cell No. 6, a layer of cellophane was sandwiched between two layers of Celgard 3400; the cell was still working after 125 cycles. This demonstrates that when cellophane is protected from oxidative degradation, in this case by the two layers of Celgard 3400, the capacity maintenance of the nickel-zinc cells is significantly improved.

In cell No. 7, the separator was prepared as follows: (1) a 1 mil layer of Celgard 2500 was coated on one face with a layer of nickel 350 Å thick; (2) a layer of cellophane was placed over the coated face; and (3) the resulting barrier layer was sandwiched between two 1 mil layers of Celgard 3400. The separator was accordion wrapped around the anodes and cathodes with the cellophane layer being toward the zinc anode side. After 50 cycles the cell was delivering 6.5 Ah (presently still cycling), the best capacity maintenance yet attained. Also, this cell does not generate hydrogen.

On the basis of these test results, the general design illustrated by Cell No. 7 appears to be best, i.e., the nickel coated microporous polypropylene layer prevents shorts; the cellophane layer retains zincate ions and thus minimizes zinc oxide precipitation and shape change and it also prevents hydrogen evolution by preventing the transport of flaked nickel from the nickel coated layer to the zinc anode. Finally, the two outer microporous polypropylene layers isolate the nickel coated polypropylene layer and the cellophane layer from contact with the electrodes and thereby minimize oxidative attack on the cellophane layer.

It should be noted that the cellulosic layer can be a separator member (e.g., cellophane) or it can be coated one to the nickel layer (e.g., cellulose acetate). The same holds true for polyvinyl acetate.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A mass-transport separator for fully vented alkaline nickelzinc cells comprising
    (1) a barrier layer comprising a microporous polyolifin membrane which is coated with a layer of from 50 Å to 1000 Å of a low hydrogen overpotential material having a hydrogen overpotential in alkaline solution lower than that of zinc;
    (2) two protective layers comprising microporous polyolifin membranes;
    the barrier layer being sandwiched between and in contact with the two protective layers.

2. A mass-transport separator according to claim 1 wherein the coating of low hydrogen overpotential material is from 100 Å to 500 Å thick.

3. A mass-transport separator according to claim 1 wherein the barrier layer of microporous polyolifin of the separator is coated on each of the two faces with a coating of the low hydrogen overpotential material which is from 50 Å to 1000 Å thick.

4. A mass-transport separator according to claim 3 wherein each of the coatings of low hydrogen overpotential material are from 100 Å to 500 Å thick.

5. A mass-transport separator according to claim 1 wherein the barrier layer of microporous polyolifin is formed by coating each of two microporous polyolifin membranes on one face with a coating of low hydrogen overpotential material which is from 50 Å to 1000 Å thick and then placing the two membranes together with the coated faces face to face.

6. A mass-transport separator according to claim 5 wherein the coatings of low hydrogen overpotential material are from 100 Å to 500 Å thick.

7. A mass-transport separator according to claim 1 wherein the barrier layer of microporous polyolifin is formed by binding a polyolifin felt to a microporous polyolifin membrane and then coating the polyolifin felt side with a coating of low hydrogen overpotential material which is from 50 Å to 1000 Å thick.

8. A mass-transport separator according to claim 7 wherein the coating of low hydrogen overpotential material is from 100 Å to 500 Å thick.

9. A mass-transport separator according to claim 1, 2, 3, 4, 5, 6, 7, or 8 wherein the low hydrogen overpotential material is nickel.

10. A mass-transport separator according to claim 1, 2, 3, 4, 5, 6, 7, or 8 wherein the low hydrogen overpotential material is stainless steel.

11. A mass-transport separator according to claim 1, 2, 3, 4, 5, 6, 7, or 8 wherein the average pore sizes of the microporous polyolifins are from 100 Å to 500 Å.

12. A mass-transport separator for use in alkaline nickel-zinc cells comprising:
 (1) a barrier layer comprising:
  (a) a microporous polyolifin membrane which is coated with a layer of from 50 Å to 1000 Å of a low hydrogen overpotential material having a hydrogen overpotential in alkaline solution lower than that of zinc, and
  (b) a semipermeable active layer of a hydroxyl-containing polymer covering the layer of low hydrogen overpotential material;
 (2) two protective layers comprising microporous polyolifin membranes;
 the barrier layer being sandwiched between the two protective layers.

13. A mass-transport separator according to claim 12 wherein the coating of low hydrogen overpotential material is from 100 Å to 500 Å thick.

14. A mass-transport separator according to claim 12 or 13 wherein the low hydrogen overpotential material is nickel.

15. A mass-transport separator according to claim 12 or 13 wherein the low hydrogen overpotential material is stainless steel.

16. A mass-transport separator according to claim 12 or 13 wherein the average pore sizes of the microporous polyolifins are from 100 Å to 500 Å.

17. A mass-transport separator according to claim 12 or 13 wherein the semipermeable active layer of hydroxyl-containing polymer has an average pore size of from 10 Å to 50 Å.

18. A mass-transport separator according to claim 12 or 13 wherein the semipermeable active layer of a hydroxyl-containing polymer has an average pore size of from 15 Å to 25 Å.

19. A sealed alkaline nickel-zinc cell which comprises:
 A. a nickel-nickel hydroxide cathode;
 B. a zinc-zinc oxide anode;
 C. a mass-transport separator comprising:
  (1) a barrier layer comprising:
   (a) a microporous polyolifin membrane which is coated with a layer of from 50 Å to 1000 Å of low hydrogen overpotential material having a hydrogen overpotential in alkaline solution lower than that of zinc, and
   (b) a semipermeable active layer of hydroxyl-containing polymer covering the layer of low hydrogen overpotential material;
  (2) two protective layers comprising microporous polyolifin membranes,
  the barrier layer being sandwiched between the two protective layers;
 D. an alkaline electrolyte;
 E. means for terminating the charging of the cell when the internal gas pressure of the cell reaches a preselected value; and
 F. means for venting the cell if the internal gas pressure reaches a preselected value above that at which the charging of the cell is terminated.

20. The sealed alkaline nickel-zinc cell of claim 19 which has means for terminating the charging of the cell when the internal gas pressure reaches a preselected value in the range of from 5.0 to 8.0 psig.

21. The sealed alkaline nickel-zinc cell of claim 20 wherein means are provided for venting the cell when the internal gas pressure of the cell reaches 10.0±0.5 psig.

22. A sealed alkaline nickel-zinc cell according to claim 19, 20, or 21 wherein the coating of low hydrogen overpotential material in the separator is from 100 Å to 500 Å thick.

23. A sealed nickel-zinc cell according to claim 19, 20, or 21 wherein the low hydrogen overpotential material in the separator is nickel.

24. A sealed nickel-zinc cell according to claim 19, 20, or 21 wherein the low hydrogen overpotential material in the separator is stainless steel.

25. A sealed nickel-zinc cell according to claim 19, 20, or 21 wherein the average pore sizes of the microporous polyolifins in the separator are from 100 Å to 500 Å.

26. A sealed nickel-zinc cell according to claim 19, 20, or 21 wherein the semipermeable active layers of hydroxyl-containing polymer in the separator has an average pore size of from 10 Å to 50 Å.

27. A sealed nickel-zinc cell according to claim 19, 20, or 21 wherein the semipermeable active layer of a hydroxyl-containing polymer in the separator has an average pore size of from 15 Å to 25 Å.

* * * * *